United States Patent
Maurer (10) Patent No.: US 10,239,169 B2
(45) Date of Patent: Mar. 26, 2019

(54) STEADY REST

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 15/618,849

(22) Filed: Jun. 9, 2017

(65) Prior Publication Data
US 2017/0355048 A1 Dec. 14, 2017

(30) Foreign Application Priority Data
Jun. 9, 2016 (EP) ..................... 16173629

(51) Int. Cl.
*B23Q 1/76* (2006.01)
*B23Q 17/00* (2006.01)

(52) U.S. Cl.
CPC ............ *B23Q 1/76* (2013.01); *B23Q 17/005* (2013.01); *B23Q 2240/007* (2013.01)

(58) Field of Classification Search
CPC .. B23Q 1/76; B23Q 2240/007; B23Q 17/005; B24B 41/06; Y10T 82/2593; Y10T 82/2597
See application file for complete search history.

(56) References Cited

U.S. PATENT DOCUMENTS

| 3,535,963 | A | * | 10/1970 | Dietl | B23Q 1/76 82/162 |
| 4,416,174 | A | * | 11/1983 | Owsen | B23Q 1/76 451/408 |
| 4,463,635 | A | * | 8/1984 | Hafla | B23Q 1/76 294/116 |
| 4,519,279 | A | * | 5/1985 | Ruggeri | B23Q 1/76 294/116 |
| 4,546,681 | A | * | 10/1985 | Owsen | B23Q 1/76 294/116 |
| H000045 | H | * | 4/1986 | Gilmore | 30/392 |
| 4,754,673 | A | * | 7/1988 | Hiestand | B23Q 1/76 82/162 |

(Continued)

FOREIGN PATENT DOCUMENTS

| DE | 3137149 | 4/1983 |
| DE | 20 2009 004439 | 6/2009 |

(Continued)

*Primary Examiner* — Sara Addisu
(74) *Attorney, Agent, or Firm* — Pandiscio & Pandiscio (57) ABSTRACT

A steady rest (1) for centering a rotationally symmetrical workpiece (2) in relation to a longitudinal axis of a processing machine, having, two housing shells (4, 5) separated by a distance from one another and connected together, an actuating piston (7) mounted in an axially moving arrangement in the housing shells (4, 5) which acts on the workpiece (2), three steady rest arms (8, 9, 10) mounted to the two housing shells (4, 5) in a swiveling arrangement by a bearing pin, and configured to move in concert so as to clamp the workpiece, wherein the clamping forces actually occurring on the steady rest arms (8, 9, 10) can be registered reliably using a force measuring device (21) provided on at least one of the two steady rest arms (8, 9), and passed onto an evaluation device (22).

13 Claims, 7 Drawing Sheets

(56) References Cited

U.S. PATENT DOCUMENTS

| | | | | |
|---|---|---|---|---|
| 5,201,501 | A * | 4/1993 | Fassler | B23Q 1/76 269/156 |
| 6,458,022 | B1 * | 10/2002 | Folz | B23Q 1/76 269/196 |
| 9,937,596 | B2 * | 4/2018 | Maurer | B23Q 1/76 |
| 2008/0289463 | A1 * | 11/2008 | Rehm | B23Q 1/76 82/164 |
| 2009/0001643 | A1 * | 1/2009 | Rehm | B23Q 1/76 269/55 |
| 2011/0209591 | A1 * | 9/2011 | Helm | B23Q 1/76 82/162 |
| 2013/0047804 | A1 * | 2/2013 | Maurer | B23Q 1/76 82/164 |
| 2016/0332270 | A1 * | 11/2016 | Maurer | B23Q 1/76 |
| 2016/0332271 | A1 * | 11/2016 | Maurer | B23Q 1/76 |

FOREIGN PATENT DOCUMENTS

| | | |
|---|---|---|
| DE | 10 2014 202263 | 8/2015 |
| EP | 2540438 | 1/2013 |
| JP | H10 118892 | 10/1998 |

* cited by examiner

STEADY REST

REFERENCE TO PENDING PRIOR PATENT APPLICATION

This patent application claims benefit of European Patent Application No. 16 173 629.3, filed Jun. 9, 2016, which patent application is hereby incorporated herein by reference.

FIELD OF THE INVENTION

The present invention relates to a steady rest for centring a rotationally symmetrical workpiece in relation to a longitudinal axis of a processing machine, in accordance with the pre-characterising clause of patent claim 1.

BACKGROUND OF THE INVENTION

Steady rests of this kind have been used for decades for supporting rotationally symmetrical workpieces in the space during the machining process of a processing machine, so as to prevent the bowing of the workpieces, or at least keep this to a very low extent. Often, the workpieces to be machined are shafts or axles for electric motors that have a length extending over several meters. Moreover, due to the machining forces at different positions during the machining procedures, forces are applied which can cause the workpieces to shift if they are not reliably supported by the steady rests to prevent bowing and other deflections.

Steady rests of this kind have been disclosed in a large number of different design embodiments. Usually, the required clamping force is generated by means of an actuating piston positioned axially in the housing shells in a movable arrangement, which is in a driving connection with the three steady rest arms. The two outer steady rest arms in this case are located in a swiveling arrangement on the housing shells and carry out a swiveling movement about a bearing pin allocated to the housing shells, with the effect that when the actuating piston is retracted, the two outer steady rest arms swivel up and the middle steady rest arm is drawn back. During the advance movement of the three steady rest arms caused by the actuating piston, the two outer steady rest arms carry out a swiveling movement in the direction of the workpiece while the middle steady rest arm is moved axially towards it. The movements of the three steady rest arms consequently take place synchronously, with the effect that they make contact with the surface of the workpiece at the same time and also exert an identical holding force on the workpiece to be clamped, which is chiefly applied by the actuating piston.

Moreover, a method for registering the clamping forces applied by the advance piston or actuating piston has been disclosed. For example, sensors are provided on it which register possible deformations of the actuating piston and, taking this information, can use mathematical or physical calculations to establish force measuring values which can be set in relationship with the actual clamping forces due to values based on experience and other correlation measures.

It has proven to be a disadvantage that the advance forces registered at the actuating piston often do not precisely correlate to the actual clamping forces which occur between the steady rest arms and the workpiece to be clamped, because for one reason the workpieces have different material properties depending on the hardness of the material used which represents an error source, while for another reason due to geometrical factors there are deviations between the contact position of the particular steady rest arms and the actuating piston which can arise due to material wear on the steady rest arms or their components giving rise to additional error sources.

SUMMARY OF THE INVENTION

Therefore, it is the task of the present invention to provide a steady rest of the aforementioned type which reliably registers the actual clamping forces of the steady rest arms which occur and communicates them to an evaluation device for further processing in order to obtain an accurate calculation of the clamping forces actually acting on the workpiece depending on the material of the workpiece used and the geometrical or mechanical relationships on the steady rest.

In accordance with the present invention, this task is accomplished by the features of the characterising part of patent claim 1.

Other advantageous further embodiments of the present invention are derived from the subordinate claims.

As a result of a force measuring device being provided on at least one of the two outer steady rest arms by means of which the clamping force of the particular outer steady rest arm is registered during the clamped condition and is communicated to an evaluation unit, it is guaranteed that the clamping or holding force exerted by the one outer steady rest arm on the workpiece will be registered by the measuring device and the corresponding measuring signal can be output permanently to an evaluation device for further processing, as a result of which the actually prevailing clamping forces can be monitored continuously even during the machining procedure.

In principle, the force measurement can be carried out at any point between the free end of one of both outer steady rest arms and its bearing point on the housing shells. For this purpose, the patent application proposes three different attachment positions for a force measuring device configured in accordance with the present invention.

Firstly, the force measuring device can be allocated to the bearing pin, or the bearing pin can be configured as a force measuring shaft with one or more strain gauges applied to it at particular points. The strain gauges in this case are located at a weak point on the force measuring shaft, for example. The weak point on the force measuring shaft is achieved in that a groove is worked into the shaft at this point. As soon as corresponding forces are transmitted, increased defamation will take place in the area of the groove, which will be recorded by the strain gauges and passed on to the evaluation device.

Such weak points can also be increased further by blind holes arranged in the groove without the strength of the bearing pin or the force measuring shaft being weakened overall. As a result, the deflection of the particular steady rest arms and the reliable force transmission by them can be guaranteed while at the same time the force profiles are channeled through these artificially created weak points, in which position one or more strain gauges is or are arranged in each case.

Moreover, the roller attached to the free end of the outer steady rest arms can be used for force measurement as it makes direct contact with the surface of the workpiece to be clamped, namely if its bearing shaft is used as the force measuring shaft. Corresponding weak points in the form of grooves and blind holes can also be provided for the force measuring shaft of the particular bearing rollers, and in that case they have the strain gauges arranged within them.

Furthermore, the strain gauges can also be arranged directly on the outside of one of the outer steady rest arms so as to measure a corresponding deformation of the steady rest arms in this area when there is corresponding force initiation or when holding forces arise. Weak points in the form of grooves are also worked into the steady rest arms, with the strain gauges running within them in a preferred embodiment.

The arrangement of the strain gauges irrespective of their actual position, for example in the bearing shaft of the roller or the bearing pin of the steady rest arm or on the outside of the steady rest arm means they are attached in the area of the force profile and run parallel to it. As a result, the corresponding force changes act without delay or impediment on the strain gauges, with the effect that the actual holding forces of the three steady rest arms against the workpiece are recorded permanently and without either mechanical or geometrical effects, and can be transmitted to the evaluation device for further processing.

The force measuring values registered in this way are subsequently used for evaluating the actual clamping status of the three steady rest arms on the workpiece, and provide the user of these steady rest arms configured in accordance with the present invention with an exact report on the status of the actually prevailing clamping force of the three steady rest arms on the workpiece depending on the axial force applied by the actuating piston, because this can be measured or calculated by means of additional sensors if, namely, the driving means used, for example their torque or actuating forces, are known.

It goes without saying that several force measuring devices can be used at different positions.

BRIEF DESCRIPTION OF THE DRAWINGS

The drawing shows three sample embodiments of a steady rest configured in accordance with the present invention, the details of which are explained below. In the drawing.

DETAILED DESCRIPTION OF THE PREFERRED EMBODIMENTS

Figure 1:
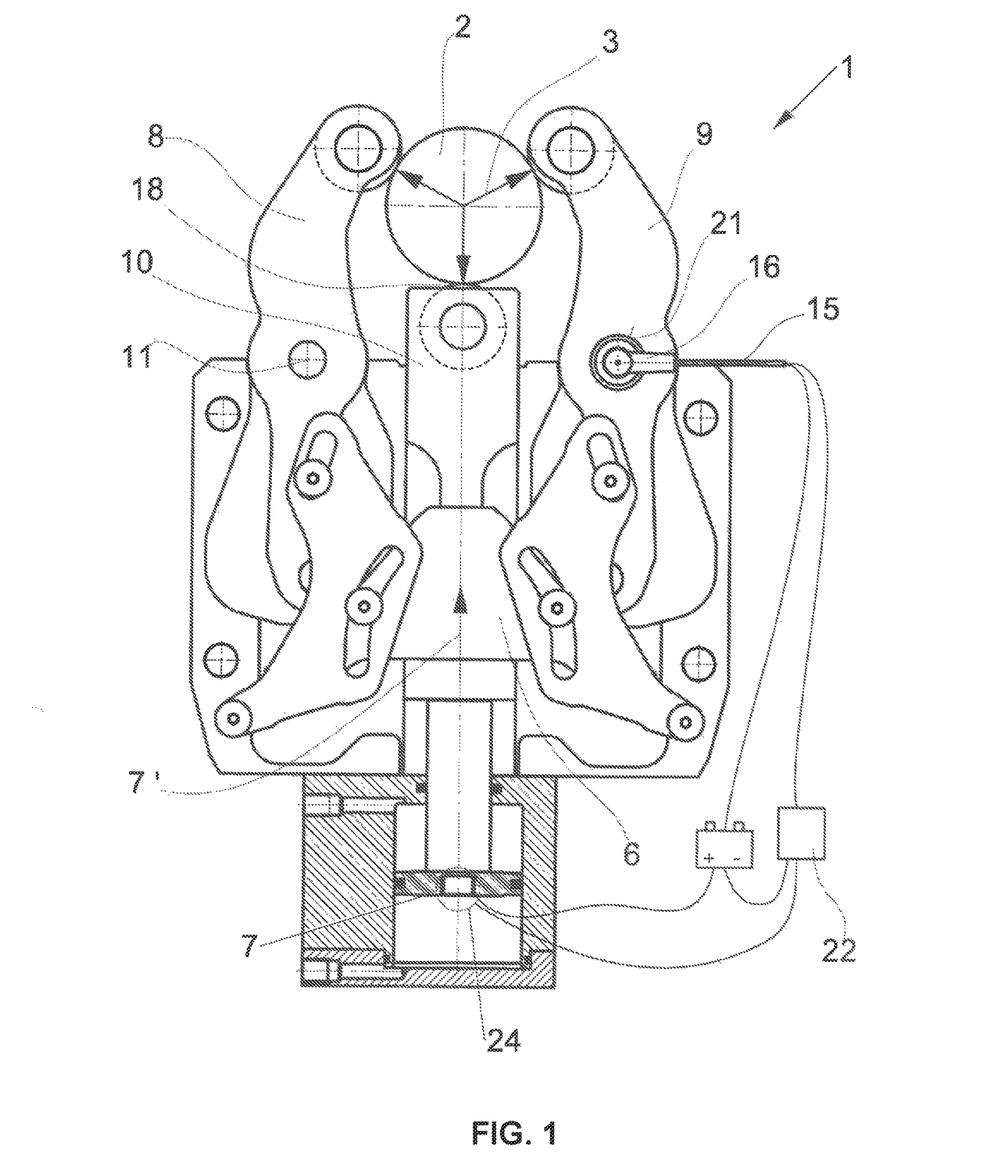
FIG. 1 shows a steady rest with a housing comprising two housing shells on which three steady rest arms are mounted in a swiveling or axially moving arrangement and in which an actuating piston is located in a driving arrangement with the three steady rest arms, and a bearing pin is provided on one of the two outer steady rest arms which is configured as a force measuring shaft.

FIG. 1 shows a steady rest 1 by means of which a rotationally symmetrical workpiece 2 is to be held centrally in the space by means of a clamping force. Steady rests 1 of this kind are intended to hold the workpieces 2 as coaxially as possible with a longitudinal axis of a machine tool that is not illustrated. Often, such workpieces 2 are shafts with a long length which are provided for an electric motor, for example, and are machined by the machine tool. During the machining process, significant processing forces are applied to the particular workpiece 2, with the effect that it is pressed out of the required position not only under its own weight but also by means of the machining forces. Furthermore, the workpieces 2 are rotated for the purpose of machining them, meaning that additional centrifugal forces apply which are also to be supported by the steady rest 1

The steady rest 1 consists of two housing shells 4, 5 in which a guide slide 6 firmly attached to an actuating piston 7 is mounted in an axially moving arrangement. The direction of movement of the actuating piston 7 is at right angles to the longitudinal axis of the workpiece 2. The guide slide 6 largely has a triangular contour in the cross-section and both outer legs of the guide slide 6 are configured as a control cam 6'. The actuating piston 7 can be moved axially by mechanical or electrical driving means, and generates an axial clamping force 7'.

Furthermore, two outer steady rest arms 8, 9 and a middle steady rest arm 10 are allocated to the steady rest 1, by means of which the workpiece 2 is clamped. The middle steady rest arm 10 carries out an axial advance movement, because it is directly attached to the actuating piston 7.

The two outer steady rest arms 8, 9 are mounted in a swiveling arrangement by means of a bearing pin 11 on the housing shells 4, 5 of the steady rest, and thus carry out a swiveling movement on the workpiece 2 when this is to be clamped, or move away from it when the machining procedure for the workpiece 2 has been completed and it should be removed from the machine tool, because the free ends of the steady rest arms 8, 9 running within the housing shells 4, 5 make contact with the control cam 6' and are thus in a permanent, active connection with it.

Figure 2:
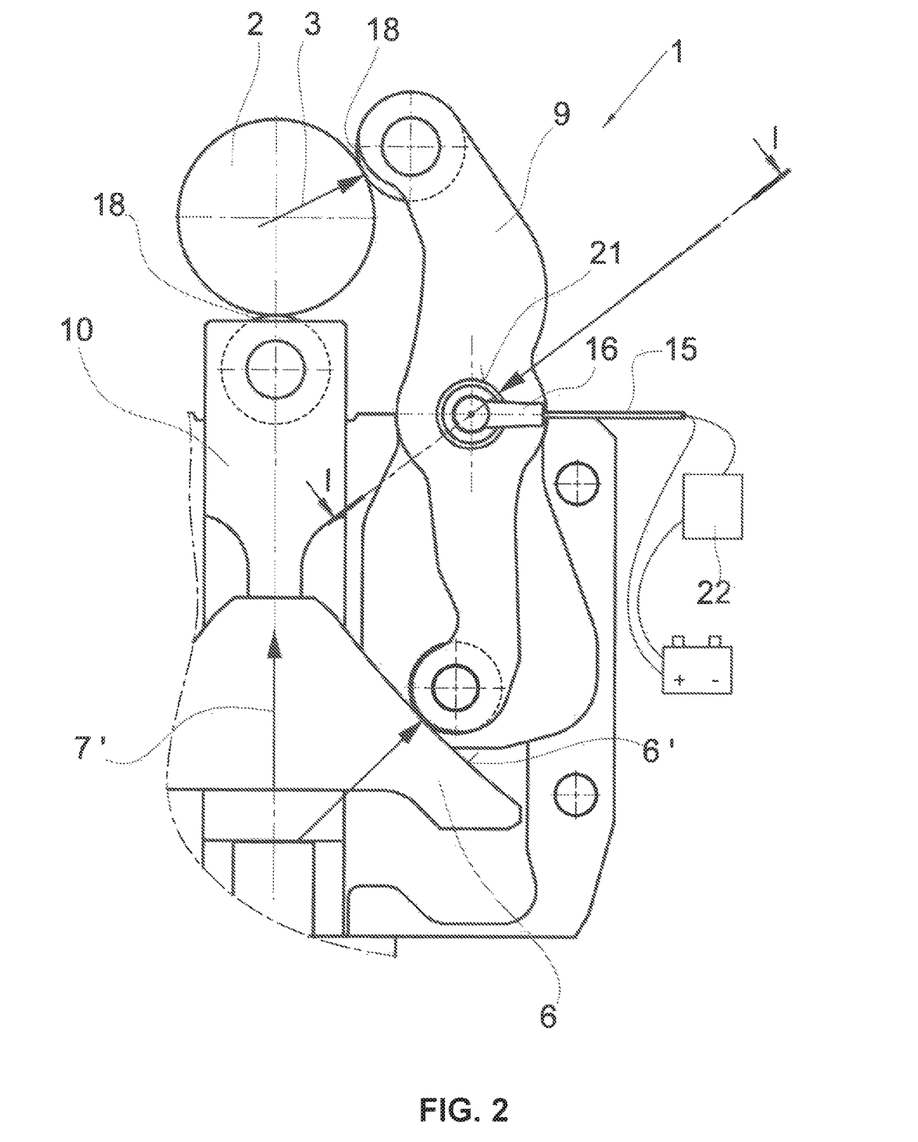
FIG. 2 shows the steady rest in accordance with FIG. 1 with a schematically shown force profile between the clamping position of a workpiece and the force transmission between the outer steady rest arm and the actuating piston.

In accordance with FIG. 2, one of the bearing pins 11 of the second steady rest arm 9 is configured as a force measuring shaft 12. The force measuring shaft 12 as well as strain gauges 23 attached to it form a force measuring device 21 that is connected to an evaluation device 22 by means of one or more electrical cables 50.

Figure 3:
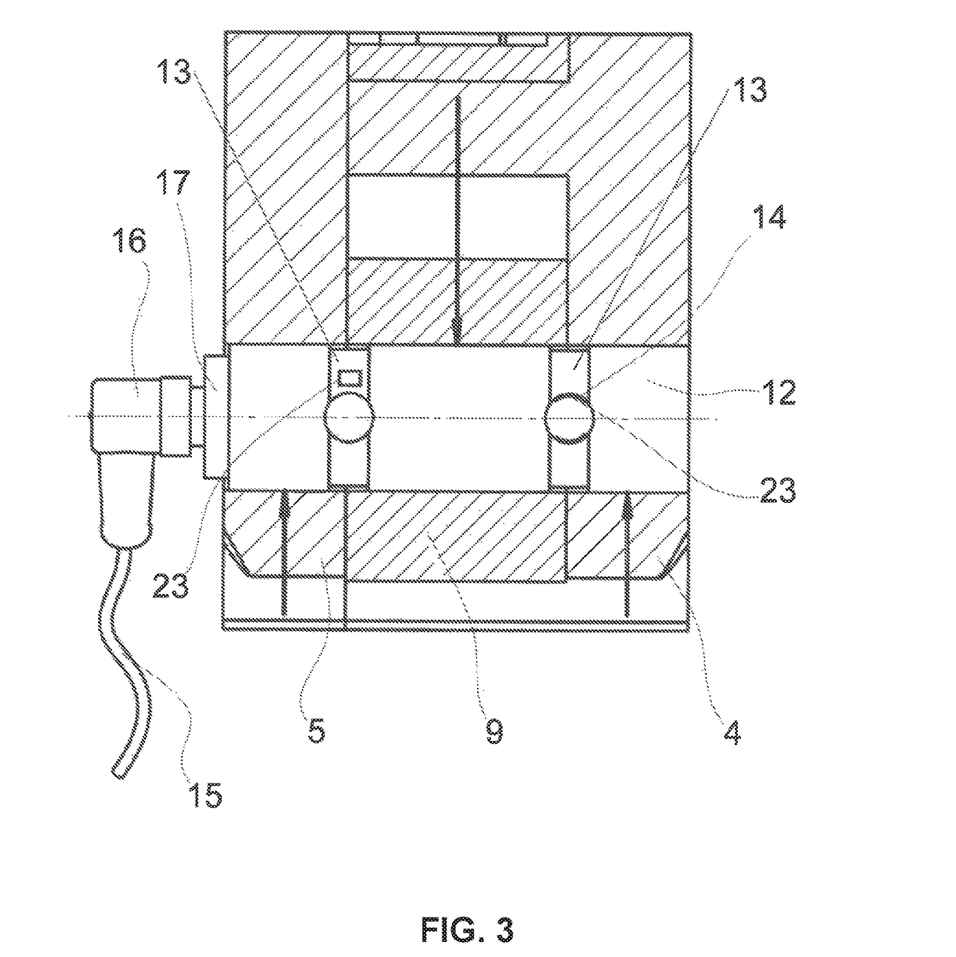
FIG. 3 shows a section in accordance with FIG. 1 along the section line III-III through the measuring shaft device as well as an electric coupling.

FIG. 3 shows the detailed design of the force measuring shaft 12 in which two circumferential grooves 13 are worked that are to be regarded as weak points in the force measuring shaft 12. The clamping forces transmitted by the force measuring shaft 12 give rise to the effect in the area of the particular groove 13 that the force measuring shaft 12 is compressed or stretched. Moreover, one or more blind holes 14 can be worked into the corresponding groove 13, by means of which additional weak points or bending profiles are created in the force measuring shaft 12. The strain gauges 23 in this case can be attached either in the groove 13 or in the blind hole 14 and normally run parallel to the force profile in the force measuring shaft 12. The strain gauges 23 are connected by electrical cables 15 to a plug 16 which can be connected to a socket 17 outside the steady rest arm 9, in which case the socket 17 is connected to the evaluation device 22 by means of the electrical cables 15. As a result, the electrical signals generated by the strain gauges 23 can be registered directly and permanently, and evaluated accordingly, so that the corresponding operating status of the steady rest 1 can be digitalised and the clamping forces 3 actually occurring are registered and can be displayed. As a result of this, the corresponding machining processes can be measured precisely for each operating status and at any time, because they are registered directly by the force measuring shaft 12 and transferred to the strain gauges 23.

Figure 4:
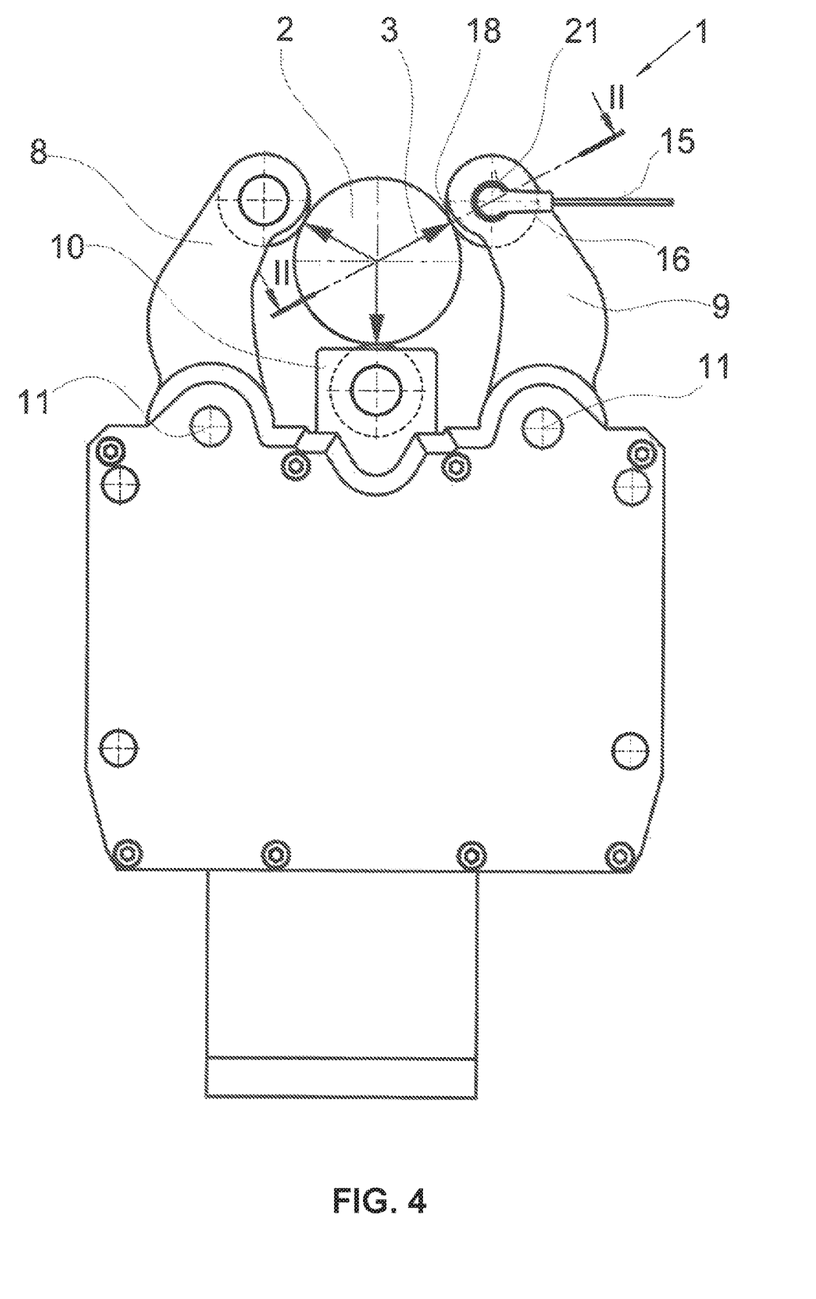
FIG. 4 shows the steady rest in accordance with FIG. 1 with a roller shaft attached to one of the free ends of the outer steady rest arms which serves as a force measuring shaft.
Figure 5:
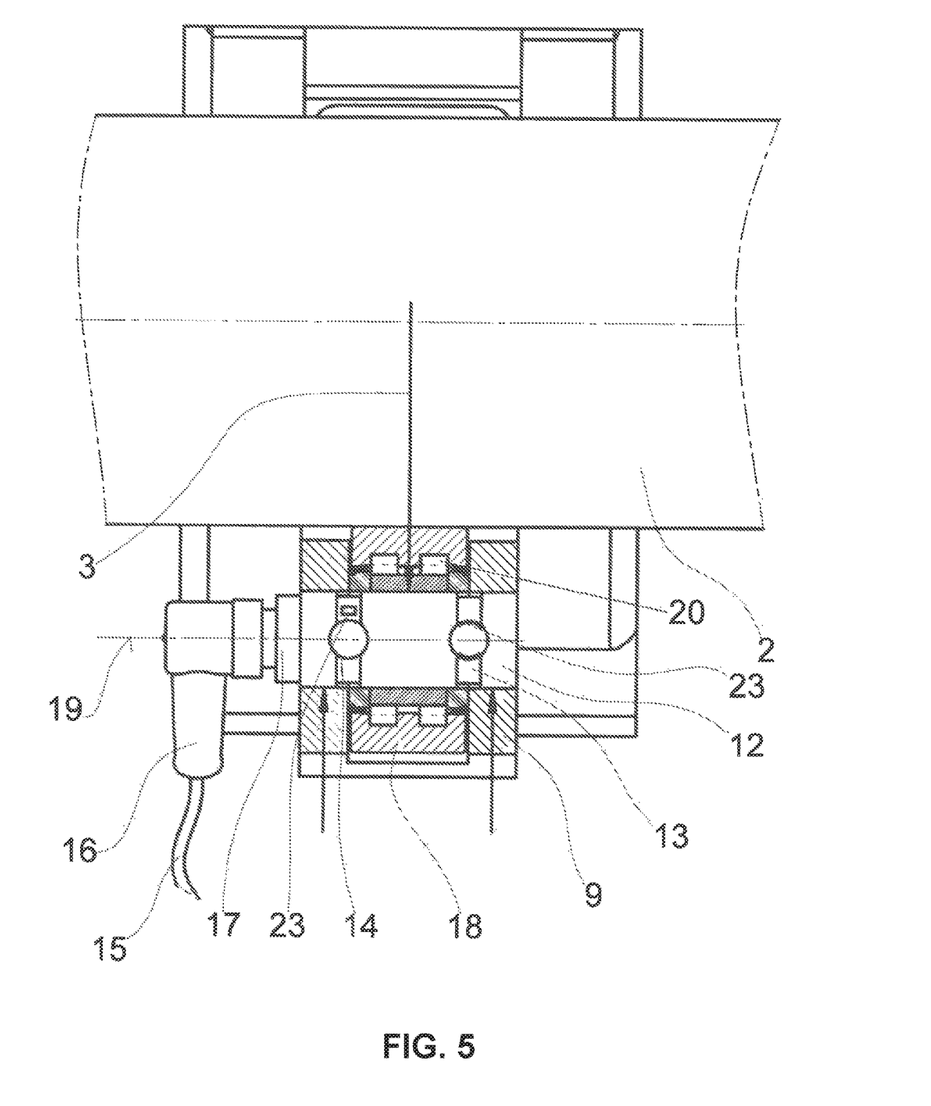
FIG. 5 shows a section along the section line V-V in accordance with FIG. 4.

Normally, in accordance with FIG. 4, the free ends of both outer steady rest arms 8, 9 are equipped with a roller 18 which makes direct contact with the surface of the workpiece 2 to be clamped and which are connected to the corresponding steady rest arm 8 or 9 in a rotating arrangement by means of a roller shaft 19. The speed of rotation of the workpiece 2 is thus registered by the particular roller 18 which is in direct contact with the workpiece 2, with the effect that the clamping forces 3 actually prevailing act directly on the roller 18 or its roller shaft 19. One of the roller shafts 19 is replaced by the force measuring shaft 12 as shown in FIG. 5. A bearing 20 is provided between the steady rest arm 9 and the force measuring shaft 12. The force measuring shaft 12 once again has two circumferential grooves 13 each of which has one or more blind holes 14 into which one or more of the strain gauges 23 is/are attached at the wall or the base of the blind hole 14. The strain gauges 23 are connected via electrical cables 19 to a plug which can be connected to a socket 17 provided outside the roller.

Figure 6:
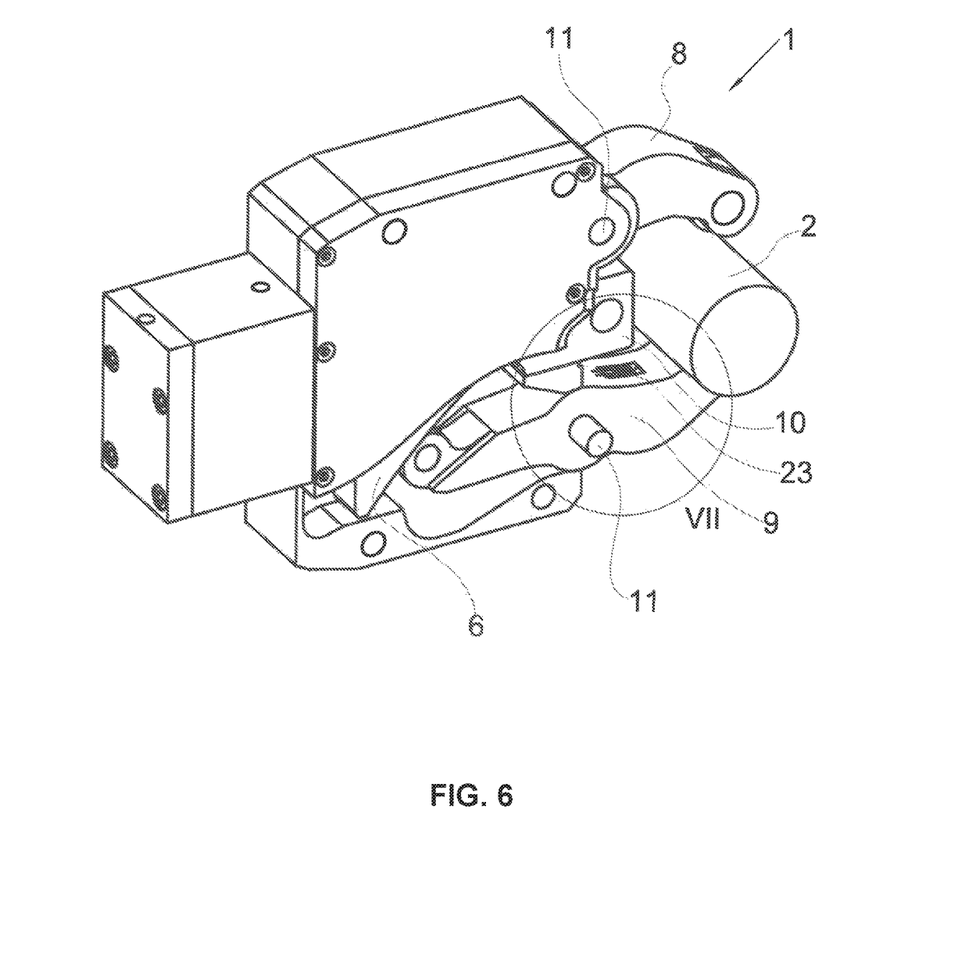
FIG. 6 shows a steady rest in accordance with FIG. 1 with a force measuring device attached to one of the outer steady rest arms, in a perspective view
Figure 7:
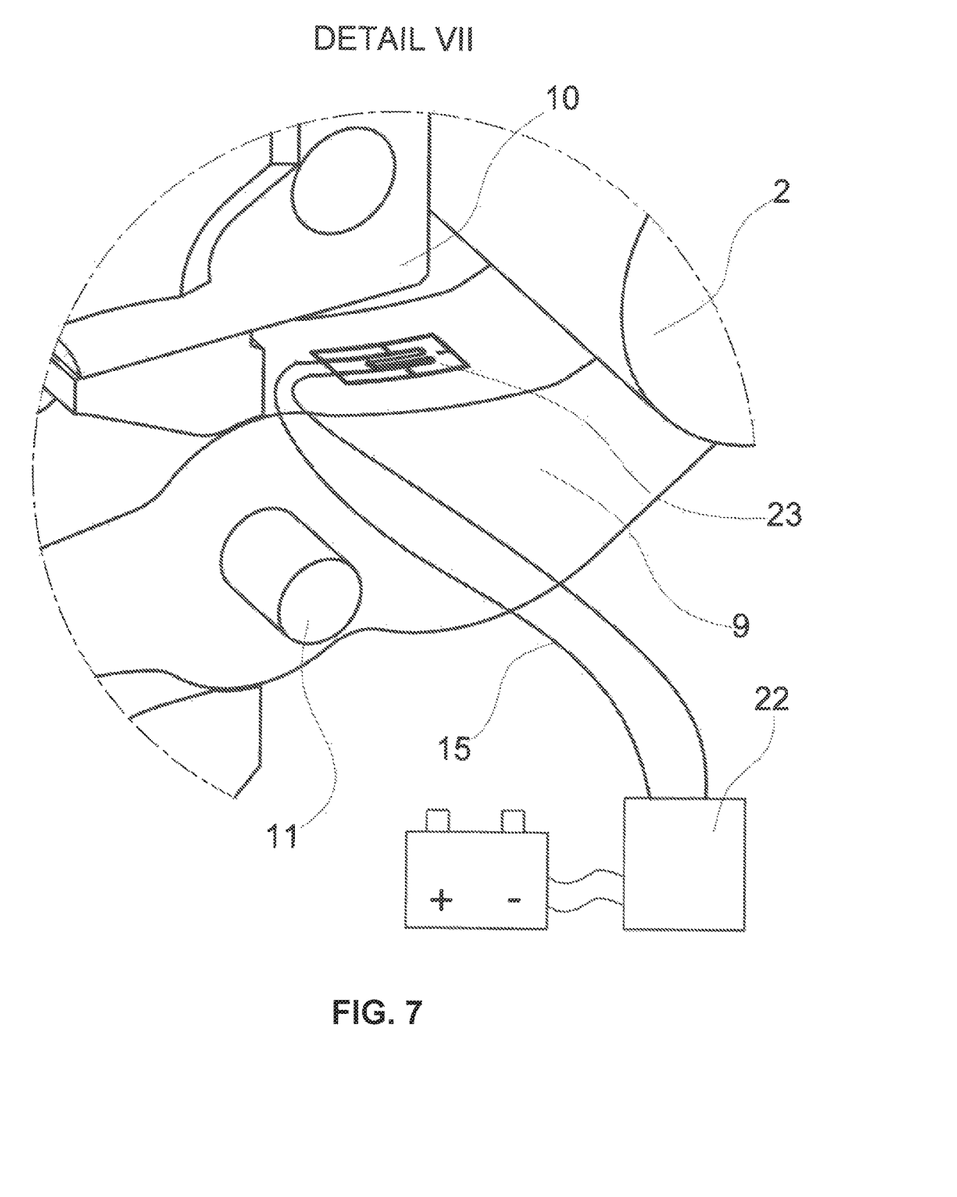
FIG. 7 shows a magnified view of the force measuring device in accordance with FIG. 6.

FIGS. 6 and 7 show a further possibility for providing the strain gauges 23 between the force application at the workpiece 2 and the bearing shaft 11 of one of the two outer steady rest arms 8 or 9. In this case, the strain gauge 23 is attached to the outside of the steady rest arm 9. In the area of the strain gauge 23, it is possible to work a weak point into the steady rest arm 9 in the form of a groove or the like so as to increase the flexure of the steady rest arm 9 in this area of the strain gauge 23 and thus improve the measuring accuracy.

What is claimed is:

1. A steady rest for centering a rotationally symmetrical workpiece in relation to a longitudinal axis of a processing machine, consisting of:
    two housing shells separated by a distance from one another and connected together;
    an actuating piston mounted in an axially moving arrangement in the housing shells for generating a clamping force which acts on the workpiece;
    three steady rest arms mounted to the two housing shells, wherein at least two of the steady rest arms are each mounted to the two housing shells in a swiveling arrangement by a bearing pin, and configured to move in concert so as to clamp;
    characterized in that, a force measuring device is provided on at least one of the two steady rest arms, by means of which the clamping force of the particular steady rest arm is registered during the clamped condition and passed onto an evaluation device;
    wherein the force measuring device consists of (i) at least one of the bearing pins that is configured as a force measuring shaft about which the particular steady rest arm is swiveled within a predefined angle range, and (ii) at least one strain gauge assigned to the force measuring shaft.

2. The steady rest in accordance with claim 1, characterized in that the force measuring shaft comprises at least one circumferential groove in which the at least one strain gauge is arranged, wherein the at least one strain gauge is linked electrically by means of cables to the evaluation device.

3. The steady rest in accordance with claim 2, characterized in that one or more blind holes is/are worked into the at least one circumferential groove, and the at least one strain gauge is arranged on the side wall and/or the base of the blind hole.

4. The steady rest in accordance with claim 1, characterized in that at least one of the steady rest arms comprises a roller mounted to the at least one steady rest arm by a roller bearing shaft, the roller being configured to contact the workpiece, and further wherein the roller bearing shaft of the roller is configured as a force measuring device.

5. The steady rest in accordance with claim 4, characterized in that the roller bearing shaft is configured as a force measuring shaft with at least one circumferential groove worked into it, and that at least one strain gauge is arranged in the at least one circumferential groove and is connected to the evaluation device by means of electrical cables.

6. The steady rest in accordance with claim 5, characterized in that at least one blind hole is worked into the at least one circumferential groove and that the at least one strain gauge is arranged on the wall and/or base of the blind hole.

7. The steady rest in accordance with claim 1, characterized in that at least one strain gauge is arranged on one of the steady rest arms and is connected to the evaluation device by means of electrical cables, and that the at least one strain gauge is arranged on the outside of the steady rest arm.

8. The steady rest in accordance with claim 7, characterized in that a groove is worked into one of the steady rest arms and that the corresponding strain gauge is arranged on the wall and/or the base of the groove.

9. The steady rest in accordance with claim 1, characterized in that the corresponding strain gauge is located in the area of the force profile and is aligned in parallel with it.

10. The steady rest in accordance with claim 1, characterized in that the axial advance force of the actuating piston is registered by means of one or more sensors, and the evaluation device establishes a mathematical or physical relationship between the axial clamping force and the force measuring values registered by the at least one strain gauge.

11. The steady rest in accordance with claim 1, characterized in that the at least one strain gauge comprises electrical cables, and further wherein the electrical cables of the strain gauge are coupled to a socket by means of a plug, whereby to comprise a releasable arrangement, such that the socket is connected to the evaluation device by means of additional electrical cables.

12. A steady rest for centering a rotationally symmetrical workpiece in relation to a longitudinal axis of a processing machine, consisting of:
    two housing shells separated by a distance from one another and connected together;
    an actuating piston mounted in an axially moving arrangement in the housing shells for generating a clamping force which acts on the workpiece;
    three steady rest arms mounted to the two housing shells, wherein at least two of the steady rest arms are each mounted to the two housing shells in a swiveling arrangement by a bearing pin, and configured to move in concert so as to clamp the workpiece;
    characterized in that, a force measuring device is provided on at least one of the two steady rest arms, by means of which the clamping force of the particular steady rest arm is registered during the clamped condition and passed onto an evaluation device;
    wherein at least one of the steady rest arms comprises a roller mounted to the at least one steady rest arm by a roller bearing shaft, the roller being configured to contact the workpiece, and further wherein the roller bearing shaft of the roller is configured as the force measuring device; and wherein the roller bearing shaft is configured as a force measuring shaft with at least one circumferential groove worked into it, and that at least one strain gauge is arranged in the at least one circumferential groove and is connected to the evaluation device by means of electrical cables.

13. A steady rest for centering a rotationally symmetrical workpiece in relation to a longitudinal axis of a processing machine, consisting of:

two housing shells separated by a distance from one another and connected together;

an actuating piston mounted in an axially moving arrangement in the housing shells for generating a clamping force which acts on the workpiece;

three steady rest arms mounted to the two housing shells, wherein at least two of the steady rest arms are each mounted to the two housing shells in a swiveling arrangement by a bearing pin, and configured to move in concert so as to clamp the workpiece;

characterized in that, a force measuring device is provided on at least one of the two outer steady rest arms, by means of which the clamping force of the particular outer steady rest arm is registered during the clamped condition and passed onto an evaluation device;

wherein at least one strain gauge is arranged on one of the steady rest arms and is connected to the evaluation device by means of electrical cables, and that the at least one strain gauge is arranged on the outside of the steady rest arm.

* * * * *